United States Patent [19]
Davies et al.

[11] Patent Number: 5,298,062
[45] Date of Patent: Mar. 29, 1994

[54] EUTECTIC COMPOSITIONS FOR HOT MELT JET INKS

[75] Inventors: Nicholas A. Davies, Elgin, Ill.; Beatrice M. Nicholas, Tring, United Kingdom

[73] Assignee: Videojet Systems International, Inc., Wood Dale, Ill.

[21] Appl. No.: 932,346

[22] Filed: Aug. 19, 1992

[51] Int. Cl.$^5$ ............................................. C09D 11/02
[52] U.S. Cl. ............................. 106/20 R; 106/20 D; 106/23 A; 106/22 A; 346/1.1; 346/33 TP
[58] Field of Search .............. 106/20 R, 20 D, 23 A, 106/22 A; 346/1.1, 33 TP

[56] References Cited

U.S. PATENT DOCUMENTS

| | | | |
|---|---|---|---|
| 3,776,742 | 12/1973 | Sanders | 106/22 B |
| 4,820,346 | 4/1989 | Nowak | 106/30 A |
| 4,878,946 | 11/1989 | Tabayashi et al. | 106/27 A |
| 4,931,095 | 6/1990 | Nowak et al. | 106/22 A |
| 5,000,786 | 3/1991 | Matsuzaki | 106/27 A |
| 5,006,170 | 4/1991 | Schwarz et al. | 106/27 A |

FOREIGN PATENT DOCUMENTS 057692 4/1982 Japan.

Primary Examiner—Helene Klemanski
Attorney, Agent, or Firm—Leydig, Voit & Mayer, Ltd.

[57] ABSTRACT

A hot melt ink comprising, a eutectic composition and an image-forming agent, wherein the melting point of the eutectic composition is from about 80° C. to about 130° C. and the compounds present in the eutectic compositions have melting points of at least about 100° C. Also disclosed is a method for ink jet printing comprising:

(a) providing a thermally reversible hot melt ink which is a solid at ambient temperature and a liquid at temperatures between about 80° C.–130° C., said ink comprising:
 (i) a eutectic composition; and
 (ii) an image-forming composition;
(b) elevating the temperature of said eutectic composition to between about 90° C. and about 140° C., to cause said ink to form a liquid solution or suspension of said image-forming composition;
(c) jetting said ink onto a substrate in the form of images;
(d) allowing said ink to crystallize upon cooling on said substrate.

16 Claims, No Drawings

EUTECTIC COMPOSITIONS FOR HOT MELT JET INKS

BACKGROUND OF THE INVENTION

This invention is related to the field of ink-jet ink compositions, particularly solid inks, which are used in thermal ink-jet printers, typically termed hot melt inks and, more particularly, to a new and improved hot melt ink.

Liquid inks have been used in many types of ink-jet printers of which the major categories are "Drop-On-Demand" ink-jet and "Continuous" ink-jet. For Drop-On-Demand ink-jet, ink is normally stored in a reservoir and delivered by capillary action to a nozzle in the print head of the printer. A means exists to force a single drop of ink out of the nozzle whenever it is needed to print a single spot on the printed medium (for example, paper). For Continuous ink-jet, ink is forced out of the nozzle in the form of a jet of ink which is unstable and subsequently breaks up into a steady stream of droplets. The trajectory of each drop is controlled typically by either electrostatic or magnetic forces. The drop can be directed either to a catcher for recycling through the main ink system or can be directed to the printed medium to form a printed spot.

Most ink jet inks are liquids at room temperature. Liquid inks suffer from various difficulties, however, especially since they do not respond the same to different printing media. Typically, liquid ink on office papers will produce a feathered appearance because it penetrates and spreads into the paper following fiber lines. Liquid inks that are designed for minimum feathering still require time to set, which may limit the rate that printed pages are stacked.

The print quality usually depends on the type of paper used, which also has an effect on the drying time and on waterfastness. Although water-based inks have been widely used, they exhibit poor waterfastness. Also, in order to prevent the ink from drying in the jet, high concentrations of humectant such as diethylene glycol have been used. This also leads to a long drying (set) time for the print on the medium and poor print quality.

Liquid inks without curable additives typically are not useful on nonporous surfaces, such as metal, glass or plastic, because they are too prone to smearing.

Further, liquid inks are very sensitive to temperature changes which influence the ink viscosity and interfacial tension, which, in turn, influences the ink interaction with the medium.

It is clear from the foregoing that major problems with liquid ink-jet inks are (i) media dependent print quality, (ii) poor reliability, (iii) poor waterfastness, and (iv) a long drying (set) time for the printed ink.

One method of solving several of the above mentioned problems is to use a phase change or hot melt ink. The ink is normally solid at room temperature. When the ink is heated, the ink melts to form a low viscosity fluid which can be ejected as droplets.

Hot melt ink was originally used by Berry et al. (U.S. Pat. No. 3,653,932, Apr. 1972) in electrostatically controlled continuous ink-jet printing. The ink was comprised of a waxy component which is solid at room temperature. The term "hot melt ink" defines an ink that is in a solid phase at room temperature and in a fluid phase at the operating temperature, which is above the melting temperature of the waxy material. Many different types of hot-melt inks have been used.

These inks are also referred to, for example, in U.S. Pat. Nos. 4,490,731, 3,653,932, 3,715,219 and 4,390,369, entitled "Natural Wax-Containing Ink Jet Inks", and its continuation Ser. No. 507,918, filed Jun. 27, 1983; U.S. Pat. No. 4,361,843, entitled "Improved Ink Jet Compositions and Methods"; U.S. Pat. No. 4,400,215, entitled "Improved Ink Jet Formulation for Reduced Start-Up Problems", and its continuation application U.S. Ser. No. 522,837, filed Aug. 12, 1983; U.S. Ser. No. 394,54, filed Jul. 1, 1982, entitled "Stearic Acid Containing Ink Jet Inks" now abandoned, and its continuation application, U.S. Ser. No. 565,124, filed Dec. 23, 1983; U.S. Pat. No. 4,386,961, entitled "Heterologous Ink Jet Ink Compositions", and its continuation application, Ser. No. 501,074, filed Jun. 5, 1983; U.S. Ser. No. 668,095, filed Nov. 5, 1984, now abandoned, and its continuation Ser. No. 006,727, filed Jan. 23, 1987; U.S. Ser. No. 672,587, filed Nov. 16, 1984, entitled "Low Corrosion Impulse Ink Jet Ink", now abandoned, and its continuation U.S. Ser. No. 037,062, filed Apr. 13, 1987.

These "hot-melt" inks normally comprise vehicles, such as natural waxes, resins and/or long chain fatty acids, esters or alcohols which melt when the ink is heated to jetting temperatures. Upon jetting, heated droplets impact the substrate and immediately freeze on the substrate surface. This phenomenon is advantageous in several respects in that dark, sharply defined print may be produced. This print may be slightly raised, suggesting that the print is engraved. Since the ink is solid at room temperature, during storage and shipment the colorant systems have less of a tendency to separate out of the ink. This has facilitated the use of various colorant systems, such as certain pigment based systems, which would not normally have been used in liquid inks.

By way of example of the types of hot-melt inks employed to date, one may refer to U.S. Pat. No. 3,653,932 which discloses an ink containing a dialkyl ester of sebacic acid; U.S. Pat. No. 3,715,219 which discloses an ink containing a higher aliphatic alcohol; U.S. Pat. Nos. 4,390,369 and 4,484,948 which disclose inks containing a natural wax; EP 99,682 which discloses an ink containing stearic acid; and U.S. Pat. No. 4,659,383 which discloses an ink that contains an acid or alcohol of C20–C24 chain length, optionally in the presence of a ketone having a comparatively high melting point.

Not all of the aforementioned hot-melt inks exhibit high solubility of dyes and the types of dyes that can be used are limited. In addition, these inks have not necessarily been stable against prolonged heating or repeated heat cycles. EP 181,198 discloses a hot-melt type ink that has a solid pigment dispersed in a wax having a melting point higher than 65° C. or an aliphatic acid or alcohol of $C_{18}$–$C_{24}$ chain length. This ink, however, has the problem of poor dispersion stability.

Another disadvantage to many hot-melt phase change inks includes the fact that the physical properties of the printed images, such as resistance to abrasion and the like is limited because the inks, when cooled are only as hard as their principal components, which are typically resinous in nature. The inks must be liquid at operating temperatures, and because operating temperatures are naturally limited due to practical consideration, including the fact that the inks when applied to the substrate, such as paper cannot cause burning or charring of the substrate.

In U.S. Pat. No. 3,653,932 the composition is required to have a melting point which does not exceed 51° C. and contains a didodecyl sebacate which is a highly viscous material. In order to overcome the problems associated with that formulation, U.S. Pat. No. 4,390,369 proposes the use of a composition which comprises a natural wax and has a melting point below about 75° C. The use of natural waxes is also proposed in European application No. 097823, where the composition comprises a mixture of paraffin wax and stearic acid. However, such compositions do not adhere satisfactorily to plastics substrates, suffer from smudging, and problems are encountered due to the high viscosity of the components where synthetic materials are used.

U.S. Pat. No. 5,066,332 discloses a low-corrosion hot melt ink that contains 0.5% to 10% by weight of a metallo-organic compound such as overbased calcium sulphonate, basic barium sulphonate and overbased sulphurized calcium alkyl phenate as a corrosion inhibitor.

U.S. Pat. No. 5,065,167 teaches an ink jet ink including a waxy carrier that is solid at 25° C. and liquid at the operating temperature of an ink jet nozzle and a driver having a critical pressure greater than 10 atmospheres, the carrier and driver being miscible in liquid phase.

U.S. Pat. No. 5,053,079 relates to a dispersed, pigmented hot melt ink that contains a thermoplastic vehicle, a colored pigment, and a dispersing agent to inhibit settling or agglomeration of pigment when the ink is molten comprising an isocyanate-modified microcrystalline wax or lignite wax in an amount of 2 to 100 weight percent of the weight of the vehicle.

U.S. Pat. No. 5,047,084 relates to an ink jet ink in the form of a microemulsion of an organic vehicle phase having a colorant dispersed therein and an aqueous phase containing a surfactant, the vehicle phase preferably being liquid at 70° C. and solid at 20° C.

U.S. Pat. No. 5,041,161 relates to jet inks that comprise vehicles, such as glyceryl esters, polyoxyethylene esters, waxes, fatty acids, and mixtures thereof, which are semi-solid at temperatures between 20° C. and 45° C.

U.S. Pat. No. 5,021,802 relates to impulse ink or bubble jet inks are disclosed which comprise 90-99.9% by weight of aqueous sol-gel medium and 0.1-10% by weight colorant. The inks are thermally reversible sol-gels which are gels at ambient temperatures and sols at temperatures between about 40° -100° C.

U.S. Pat. No. 5,000,786 relates to an ink composition for use in an ink on demand ink jet printer includes a first component, second component having a higher melting point than the first component and colorant is provided. During printing, the ink is melted and jetted onto a recording medium. The first component is selected to permeate from the melted dot of ink into the recording medium. As its concentration in the dot of ink decreases and the temperature of ink cools, the second component with the colorant will solidify and the first component will fix the second component and colorant to the recording medium. The second component is indicated to be any of many, various compositions, including o-toluenesulfonamide and p-toluenesulfonamide. In all instances, a first component is present that typically is a wax-type of material, such as a petroleum wax or a candelilla wax having a high melting point but not more than about 70° C, such as paraffin, paraffin wax, microcrystalline wax or solid-type wax formed from a combination of the compounds of these materials.

U.S. Pat. No. 4,931,095 relates to an ink for hot-melt ink-jet printing comprising a benzoate solvent which is solid at room temperature. This ink is suitable for jetting onto an opaque substrate such as paper for directly readable print, or onto a transparent substrate, such as an acetate or polycarbonate sheet, to make a projectable transparency.

U.S. Pat. No. 4,835,208 relates to a process for applying a thermoplastic composition as a series of discrete droplets from a non-contact ink jet printing apparatus to form separate drops on a substrate moving relative to the apparatus, characterized in that the molten composition is thermally stable at the temperature of application and is applied at a temperature in excess of 100° C. The process is said to be used to apply the molten composition to a variety of substrates using on-demand or continuous non-contact ink jet application techniques and to be of especial use in the application of thermoplastic inks to non-porous substrates using an on-demand ink jet printer.

U.S. Pat. No. 4,830,671 relates to a hot melt ink composition consisting of a resinous binder which is prepared by the condensation reaction of about one stoichiometric equivalent of polymerized fatty acid, about two stoichiometric equivalents of a diamine and about two stoichiometric equivalents of a monocarboxylic acid; and a colorant distributed through the resinous binder in an effective amount sufficient to impart a predetermined color to the resulting hot melt ink composition.

U.S. Pat. No. 4,822,418 relates to an ink jet composition for use in drop on demand ink jet printers comprising 85-99 weight percent of a vehicle consisting essentially of dibutyl sebacate and oleic acid. In the preferred embodiment, the dibutyl sebacate comprises between about 40 to 65, preferably about 60 weight percent of said ink. The subject ink, when utilizing an infrared readable colorant such as nigrosine base, is particularly suited for generating IR readable bar codes.

U.S. Pat. No. 4,758,276 relates to a stearic acid-containing ink jet ink for use in an ink jet apparatus which features good print quality. The ink jet ink is discharged from the ink jet ink apparatus at elevated temperatures above ambient.

U.S. Pat. No. 4,741,930 relates to color printing characterized by high color density and color contrast is provided by jetting an ink composition composed of an optically clear, phase change base material and a primary subtractive color dye which is soluble in the base material onto the surface of a printing medium to form a multiplicity of closely spaced color dots or spots arranged to define a line or character on the medium. Each dot consists of one or more well defined, optically clear, semitransparent color layers each of which has a different color so that the observed color of each dot is a true subtractive mixture of the colors in the layers. Specific ink compositions are also disclosed.

U.S. Pat. No. 4,684,956 relates to a process for applying a thermoplastic image forming composition as a series of discrete droplets from a non-contact ink jet printing apparatus to form separate drops on a substrate moving relative to the apparatus, characterized in that the molten composition is thermally stable at the temperature of application and is applied at a temperature in excess of 100° C.

U.S. Pat. No. 4,659,383 relates to a hot melt impulse ink jet ink which comprises a C20–C24 acid or alcohol containing vehicle, preferably behenic acid, and a suitable coloring agent. The preferred ink has a melting point above about 65° C., exhibits very good jettability, good heat stability at a reservoir temperature of 90° C., good material compatibility, and an improved print quality. The preferred ink comprises about 80% natural behenic acid, 15% of a ketone (such as stearone), 3% coloring agent, and 2% of a plasticizer intended to improve print quality. The subject inks are jetted at relatively high temperatures (80° –90° C.) using impulse ink jet devices.

In related application Ser. No. 394,153, filed Jul. 1, 1982 (Lin et al), a number of hot melt impulse ink jet inks are disclosed which are described as being solid or semi-solid at ambient temperature. In addition to stearic acid, the Lin et al. application discloses that additives such as oleic acid, typophor black, nigrosine base, benzyl ether, compounded or chemically modified waxes (including natural or other synthetic substances), a coloring agent or dye, such as oil or solvent soluble dye, etc. may be used in formulating the disclosed hot melt inks.

U.S. Pat. No. 5,006,170 relates to hot melt ink compositions suitable for ink jet printing which comprise a colorant, a binder, and a propellant. In one embodiment, the binder comprises a liquid crystalline material. The hot melt inks with liquid crystalline binders are said to exhibit sharp melting points, which enables rapid melting of the ink and rapid solidifying of the ink on the printing substrate, thereby enabling rapid printing speeds. In addition, hot melt inks with liquid crystalline binders are said to exhibit high shear thinning behavior, which means that under shear or stress, the melt viscosity is lowered. The inks are subjected to shear or stress as they pass through the jetting nozzle of the printer, and the ink viscosity is lowered during the printing process, which enables increased printing speed and also results in enhanced print quality, since the lowered viscosity of the ink enables a high degree of interaction between the ink and the printing substrate. Examples of suitable liquid crystalline materials for the inks include certain alkyl thio- beta -D-glucosides.

Other types of inks containing liquid crystalline materials include those of U.S. Pat. No. 3,776,742, which discloses an electrically conductive aqueous base ink for use in printing on a cellulose containing base member by formation of discrete droplets. The ink comprises a water soluble dye, a water soluble inorganic conductive material in an amount of 1 to 20 percent, a water soluble polyol in an amount of from 5 to 50 percent, an organic crystallizable material in an amount of from 5 to 20 percent, which organic material acts temporarily as a plasticizer for cellulose, and water. Typical crystallizable materials include sugars such as glucose, sucrose, fructose, and the like, including glucono D-lactone.

Inks containing aromatic sulfonamides have been suggested in the art. For example, U.S. Pat. No. 4,878,946 relates to a hot-melt type ink for thermal ink-jet printers that comprises an oil-soluble dye dissolved in at least one compound selected from the group consisting of a phosphoric acid ester, an aromatic sulfonamide, a hydroxybenzoic acid ester and a phthalic acid ester, the compound being in solid state at room temperature. The dye solvents that are suggested include phosphoric acid esters such as triphenyl phosphate, tri-p-tolyl phosphate, etc; aromatic sulfonamides such as N-cyclohexyl-p-toluenesulfonamide, N, N-dichloro-p-toluenesulfonamide, N-butyl-p-toluenesulfonamide, benzenesulfonamide, p-toluenesulfonamide, o-toluenesulfonamide, benzylsulfonamide, etc; hydroxybenzoic acid esters such as ethyl p-hydroxybenzoate, n-propyl p-hydroxybenzoate, iso-propyl p-hydroxybenzoate, n-butyl p-hydroxybenzoate, iso-butyl p-hydroxybenzoate, n-heptyl p-hydroxybenzoate, n-nonyl p-hydroxybenzoate, phenyl salicylate, octyl salicylate, p-tert-butylphenyl salicylate, etc; and phthalic acid esters such as dicyclohexyl phthalate, diethyl phthalate, dodecyl phthalate, diphenyl phthalate, dimethyl isophthalate, dimethyl terephthalate, diethyl terephthalate. The only sulfonamide actually employed in a working example, however, is N-cyclohexyl-p-toluenesulfonamide, Also, U.S. Pat. No. 4,820,346 relates to a hot-melt ink for an ink jet printer that is formed from a solid organic solvent having a melting point less than 150° C., that may contain a sulfonamide, or mixture thereof, and a low molecular weight thermosetting resin having a high hydroxyl number, together with a dye. The ink is said to have excellent jetting characteristics, form a hard, stable print raised above the surface of the substrate, provide high dot resolution, and remain colorfast both in the ink jet printer and on the paper, even when exposed to continued high temperatures. The solid organic solvent, in a preferred embodiment, comprises one or more aromatic sulfonamides. In particular, primary alkyl ($C_1$–$C_9$) benzenesulfonamides are said to have given excellent results. Particularly good results purportedly were obtained when the alkyl group was para to the sulfonamide group. One preferred solvent was a mixture of p-toluenesulfonamide and p-ethylbenzenesulfonamide. Preferably, the solvent mixture also comprised up to about 5 wt. % of a $C_3$–$C_9$ alkylbenzenesulfonamide, with particularly good results supposedly being obtained using about 2 wt. % p-n-butylbenzenesulfonamide or about 2 wt. % p-n-nonylbenzenesulfonamide. Good results were also alleged to have been obtained using solvent mixtures of ortho- and para-toluenesulfonamide, such as that sold under the tradename "Santicizer 9" by the Monsanto Chemical Corporation. In all instances, the solid organic solvent was used in combination with a low molecular weight thermosetting resin having a high hydroxyl number, as shown by the following table.

| Example | II-A | II-B | II-C | II-D |
| --- | --- | --- | --- | --- |
| p-toluene-sufonamide | 45 | 45 | 43 | 43 |
| p-methoxybenzene-solfonamide | 45 | | | |
| p-ethylbenzene-sulfonamide | | 45 | 45 | 45 |
| p-n-nonylbenzene-sulfonamide | | | 2 | |
| p-n-butylbenzene-sufonamide | | | | 2 |
| Desmophen 650 | 10 | 10 | 10 | 10 |
| Ultranox 626 | 1 | 1 | 1 | 1 |
| dye | <2 | <2 | <2 | <2] |

As denoted in Example 4 (comparative) below, the formulations listed under columns II-B, II-C, and II-D were tested as to the possibility that eutectic compositions were present, inherently in the examples of the '346 patent, and it was determined that eutectic compositions were not present in these formulations, as described in said comparative example.

Japanese published specification 55-54368 also discloses the use of certain limited crystalline compositions for use in hot-melt ink jet compositions. The utility of the crystalline materials disclosed therein is limited by the materials' lower melting points and other undesirable properties, such as excessive volatility and decomposition at operating temperatures. Another problem associated with such hot-melt inks is the tendency of the molten formulation to "super-cool", that is to continue to exist in the liquid stage at temperatures far below the melting point of the crystalline material, without crystallization occurring. This is undesirable because it lengthens the time necessary for the printed images to sufficiently set to resist smearing, abrasion, and feathering.

Crystalline materials that would be capable of forming desirable, hard images, have not, in general, been used as components in hot-melt inks, because of their high melting points. If they have been used, it has only been in combination with a principal additional component having a lower melting point, such as a waxy material, thus causing such ink formulations to suffer from the same type of problems as the other compositions in the prior art that employ such soft, waxy, low melting components as the principal solvent.

SUMMARY OF THE INVENTION

The present invention overcomes many of the problems associated with the prior art hot-melt compositions while achieving distinct advantages thereover. In accordance with the present invention, a hot melt ink jet ink formulation is provided that has as its solvent component a eutectic composition. The eutectic composition is preferably comprised of two or more crystalline compounds that each have melting points of at least about 100° C., preferably at least about 120° C., and most preferably from about 120° C. to about 150°. The eutectic composition itself has a melting point of at least about 80° C., preferably at least about 100° C., and most preferably from about 100° C. to about 120° C. The melting point of the ink compositions then have melting points that substantially correspond with the melting points of the eutectic compositions from which the inks are formulated.

By employing eutectic compositions as the solid solvent, it is possible to formulate inks that have very hard, crystalline properties, when applied to a substrate, but which may be applied at acceptable temperatures, such as from about 90° C. to about 140° C., preferably from about 100° C. to about 130° C., and most preferably from about 100° C. to about 120° C.

The hot-melt inks of the present invention comprise a eutectic composition and an image-forming agent, wherein the melting point of the eutectic composition is from about 80° C. to about 130° C. and the compounds present in the eutectic compositions have melting points of at least about 100° C. (to about 150° C., respectively).

The present invention also provides a method for ink jet printing comprising:

(a) providing a thermally reversible hot melt ink which is a solid at ambient temperature and a liquid at temperatures between about 80° C.–130° C., said ink comprising:
(i) a eutectic composition; and
(ii) an image-forming composition;

(b) elevating the temperature of said eutectic composition to between about 90° C. and about 140° C., to cause said ink to form a liquid solution or suspension of said image-forming composition;

(c) jetting said ink onto a substrate in the form of images;

(d) allowing said ink to crystallize upon cooling on said substrate.

DESCRIPTION OF PREFERRED EMBODIMENTS

As indicated, the present invention employs a eutectic composition as the solid solvent. The eutectic composition contains at least two compounds that each have melting points of at least about 100°–150° C. By employing the appropriate selection of compounds for the eutectic compositions, it is possible to formulate inks that have very hard, crystalline properties, when applied to a substrate, but which may be applied at acceptable temperatures, such as from about 90° C. to about 140° C., preferably from about 100 degrees to about 130° C., and most preferably from about 100° C. to about 120° C. It is preferred that all compounds in the eutectic have melting points of about 100° C. to about 150° C.

Eutectic compositions have been known for centuries. A eutectic composition is simply a composition of at least two crystalline compounds that have been combined at the specific ratio of compounds so that the melting point of the composition is minimized at a temperature below the melting point of all of the components. Not all crystalline components can be combined to achieve such a eutectic composition and certainly not all eutectic compositions will have melting points in the aforementioned desired temperature range. Determination with respect to whether such a eutectic composition can be achieved with any given pair of compounds is routinely determinable, using ordinary skill in the art. However, prior to the present invention, no one had adapted this knowledge regarding eutectic compositions to the field of ink jet printing.

Although operation at the formulation ratios that provide the actual lowest possible melting temperature is preferred, that is at the actual eutectic composition, it should be recognized that much, if not all, of the benefit of the present invention may be achieved by the use of formulations that are near the ideal eutectic ratio. Thus, for purposes of the present invention the term eutectic composition is meant to include compositions which provide melting points that are within about 20° C., preferably about 10° C., most preferably about 5° C. of the melting point of the actual eutectic composition for the same compounds. Viewed another way, the term eutectic composition is meant to include compositions in which the weight percentages of the compounds are within about 3 percent, preferably within about 0.5 percent, and most preferably within about 0.1 percent of the weight percents of the actual eutectic composition for the same compounds.

The eutectic composition of use in the present invention is preferably comprised of two or more crystalline compounds that each have melting points of at least about 100° C., preferably at least about 120° C., and most preferably from about 120° C. to about 150° C. Useful types of compounds include aromatic amides, aromatic sulfonamides and the like. Suitable compounds include acetamide; benzamide; propionamide; DL-Benzoin, ethylanthraquinone, and aromatic sulfonamides such as benzenesulfonamide, o-toluenesulfonamide, p-toluenesulfonamide, and the like.

The ratio of the components in any formulation is readily determined by performing melting point analyses of the components at various predetermined ratios until the ratio giving rise to the lowest melting point has been determined.

The compositions of the present invention also comprise one or more image forming components, preferably oil miscible or soluble. The image forming material can be one which forms a visual image on the substrate, e.g. it can be a dyestuff; or one which is detected by other means, e.g. it can be a magnetic material to be scanned by a suitable reader, or a fluorescent material, e.g. one which is detected by an ultra-violet or other radiation scanner.

The amount of image forming agent is not critical. Typically the amount of image forming agent will be from about 0.1 to about 10 percent, based upon the weight of the eutectic composition, preferably from about 0.5 to about 5 percent, and most preferably from about to about 2 percent.

If used, the colorant may be either a dye or a pigment. Exemplary dyes include the following list: solvent yellow 162, 79, 81, solvent orange 56, solvent brown 58, solvent red 122, 119, 100, solvent blue 70, solvent red 35, solvent black 27, 45, 47, solvent red 49, basic red 51, solvent violet 8, solvent blue 4, disperse yellow 64, solvent red 135, solvent red 195, disperse violet 26, solvent yellow 16, 56, 6, 7, 14, solvent red 1, 23, 24, 27, 49, solvent blue 35, solvent black 3, disperse orange 201, solvent yellow 93, disperse yellow 54, disperse red 60, solvent red 52, disperse violet 31, and the like.

Suitable dyes for use in the inks of the present invention also include Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc., and the like. Particularly preferred are solvent dyes, and within the class of solvent dyes, spirit soluble dyes are preferred because of their high compatibility with binder materials. Examples of suitable spirit solvent dyes include Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), and the like.

Amongst pigments that may be successfully used are the following: pigment yellows 1, 3, 12, 13, 14, 16, 17, 73, 74, 81, 83, 97, 98, 106, 113, 114; pigment reds 2, 3, 4, 5, 6, 7, 8, 9, 12, 14, 37, 38, 48:1, 48:2, 48:3, 48:4, 57:1, 57:2, 57:3, 88, 122, 146, 147; pigment blues 15:1, 15:2, 15:3, 15:4, 56, 61, 61:1; and pigment blacks 1, 20, carbon black, acetylene black, bone black, lamp black, graphite, and the like.

Examples of other suitable pigments include Violet Toner VT-8015 (Paul Uhlich), Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01 (American Hoechst), Irgalite Blue BCA (Ciba-Geigy), Paliogen Blue 6470 (BASF), Sudan III (red orange) (Matheson, Coleman, Bell), Sudan II (orange) (Matheson, Coleman, Bell), Sudan IV (orange) (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Gelb L1250 (BASF), Suco-Yellow D1355 (BASF), Sico Fast Yellow D1355, D1351 (BASF), Hostaperm Pink E (American Hoechst), Fanal Pink D4830 (BASF), Cinquasia Magenta (DuPont), Paliogen Black L0084 (BASF), Pigment Black K801 (BASF), and carbon blacks such as Regal 330 Registered TM (Cabot), Carbon Black 5250 and Carbon Black 5750 (Columbian Chemicals Company).

The hot melt ink may contain a corrosion inhibitor in sufficient quantity to inhibit corrosion of metal placed in contact with the ink, without adversely affecting the printing characteristics of the ink.

Other suitable corrosion inhibitors include from 0.5% to 5% of an essentially basic, heat-stable, metallo-organic sulphonate compound. The sulphonate compound may be selected from the group consisting of ammonium dinonyl naphthalene sulphonate, basic barium dinonyl naphthalene sulphonate, neutral barium dinonyl naphthalene sulphonate, ethylene diamine dinonyl naphthalene sulphonate, basic barium sulphonate naphthalene sulphonate, overbased sulphurized calcium alkyl phenate, basic calcium sulphonate, overbased calcium sulphonate and highly overbased calcium sulphonate.

The present invention may also comprise other additives, which may be any substance that can enhance the ink with regard to (i) improved solubility of other components, (ii) improved print quality, (iii) improved adhesion of the ink to the media, and (iv) control of wetting characteristics, which may be related to such properties as surface tension and viscosity, among other properties.

For example, the ink may contain a biocide. Suitable biocides include sorbic acid, 1-(3-chloroallyl)-3,5,7-triaza-1-azoniaadamantane chloride, commercially available as Dowicil 200 (Dow Chemical Company, Midland, Mich.), vinylenebis-thiocyanate, commercially available as Cytox 3711 (American Cyanamid Company, Wayne, N.J.), disodiumethylenebis-dithiocarbamate, commercially available as Dithone D14 (Rohm & Haas Company, Philadelphia, Pa.), bis(trichloromethyl) sulfone, commercially available as Biocide N-1386 (Stauffer Chemical Company, Westport, Conn.), zinc pyridinethione, commercially available as zinc omadine (Olin Corporation Stamford, Conn.), 2-bromo-t-nitropropane-1,3-diol, commercially available as onyxide 500 (Onyx Chemical Company, Jersey City, N.J.), Bosquat MB50 (Louza, Inc., Fairtown, N.J.), and the like.

In addition, other optional additives such as dispersing agents or surfactants may be present. If present, they may be present in the ink in amounts of from about 0.01 to about 20 percent by weight. Further, plasticizers such as pentaerythritol tetrabenzoate, commercially available as Benzoflex S552 (Velsicol Chemical Corporation, Chicago, Ill.), trimethyl citrate, commercially available as Citroflex (Monflex Chemical Company, Greensboro, N.C.), N,N-dimethyl oleamide, commercially available as Halcomid M-18-OL (C. P. Hall Company, Chicago, Ill.), and the like, may be present.

As indicated above, typical eutectic compositions for the hot melt inks of the present invention generally have melting points of from about 80° C. to about 130° C., and preferably from about 100° C. to about 120° C., as determined by observation and measurement on a microscope hot stage, wherein the binder material is heated on a glass slide and observed by microscope. Higher melting points are acceptable, although printhead life may be reduced at these temperatures.

Operating temperatures of the inks of the present invention are also generally from about 80° C. to about 130° C. Higher temperatures, again, are acceptable, although they may reduce the lifetime of the heater and printhead. Generally, the operating temperature is selected to obtain low ink viscosity while avoiding extensive fuming or smoking.

The viscosity of the eutectic composition at the operating temperature of the ink is generally from about 1 to about 10 centipoise, and preferably from about to about 5 centipoise. The eutectic composition should also be thermally stable in its molten state so that it does not undergo decomposition to yield gaseous products or to form heater deposits. Additionally, the eutectic composition should enable printed images with sufficient flexibility to prevent cracking or creasing.

Hot melt ink compositions of the present invention are generally prepared by combining all of the ingredients, heating the mixture to its melting point, which generally is from about 80° C. to about 130° C., and stirring the mixture for from about 5 seconds to about 10 minutes to obtain a homogeneous, uniform melt. When pigments are the selected colorants, the molten mixture may be subjected to grinding in an attritor or ball mill apparatus to effect dispersion of the pigment in the binder.

Printed images may be generated with the inks of the present invention by incorporating the inks into a thermal ink jet printer and causing droplets of the molten ink to be ejected in imagewise pattern onto a substrate such as paper or transparency material. Suitable printers for employing the inks of the present invention include commercially available ink jet printers.

The ink-jet ink of this invention avoids the problems of prior inks because it is a solid or slurry at critical times in the printing procedure. At the time the ink of this invention strikes the medium, the vehicle droplets quickly penetrate the paper to leave a sharp, optically dense mark on the paper. The mark drys rapidly and is resistant to smearing. By operating at the or near the proper ratio of the compounds to achieve a eutectic composition, the undesired phenomena of supercooling is minimized.

The compositions of this invention can be applied to a wide range of porous and non-porous substrates, e.g. paper, metal, wood, plastics or glass without the need to form any special surface layer on the substrate. However, the invention is of especial use in forming images on non-porous materials, e.g. plastics, plastics coated materials, glass and metals. The high temperature of the composition as it is deposited on a plastics substrate causes enhanced adhesion of the composition due to partial fusion with the substrate. In the case of porous substrates the compositions penetrate into the substrate as they cool. In both cases, the compositions of the invention solidify rapidly on the substrate to give a sharp image resistant to smudging.

The present invention is further illustrated by the following nonlimiting examples.

EXAMPLE 1

Benzenesulfonamide and p-toluenesulfonamide (melting point 139° C.) are combined in various ratios and the melting points for each of the ratios determined. A minimum melting point of 112° C. is found at a weight ratio of benzenesulfonamide:p-toluenesulfonamide of 41:59. The eutectic composition has a volatility of 18 grams/day/$m^2$ at 124° C. and 11 grams/day/$m^2$ at 115° C.

EXAMPLE 2

Various ratios of 2-ethylanthraquinone (melting point 111° C.) and DL-Benzoin (melting point 136° C.) are combined and the melting points for each of the ratios determined. A minimum melting point of 96° C. is found at a weight ratio of 2-ethylanthraquinone:DL-Benzoin of 25:75.

EXAMPLE 3

Various ratios of DL-Benzoin (melting point 136° C.) and benzenesulfonamide (melting point 152° C.) are combined and the melting points for each of the ratios determined. A minimum melting point of 119° C. is found at a weight ratio of DL-Benzoin:benzene-sulfonamide of 62:38. The composition recrystallizes at 83° C. upon cooling at approximately 10° C/minute. Slight deviations from the eutectic ratio cause dramatic reductions in the final crystallization temperature.

EXAMPLE 4

Comparative

To determine whether the compositions of U.S. Pat. No. 4,820,346, as discussed above, represent eutectic compositions, although no assertion in the patent is made that such is the case, the following experiments were conducted. Mixtures of para-ethylbenzene-sulfonamide and para-toluene-sulfonamide, at various ratios, were made and their respective melting points determined. A plot of those melting points established that a eutectic composition existed at a weight ratio of 63:37±3%. Thus, the compositions listed above under headings II-B, II-C, and II-D, which have weight ratios of ethylbenzenesulfonamide: para-toluene sulfonamide of 50:50, 51.9:48.9 and 51.9:48.9, respectively are not eutectic compositions.

What is claimed is:

1. A hot melt ink comprising, a eutectic composition and an image-forming agent, wherein the melting point of the eutectic composition is from about 80° C. to about 130° C. and the compounds present in the eutectic compositions have melting points of at least about 100° C.

2. The ink of claim wherein the compounds comprising the eutectic composition have melting points from about 120° C. to about 150° C.

3. The ink of claim 2 wherein the eutectic composition itself has a melting point from about 100° C. to about 120° C.

4. The ink of claim 1 wherein all compounds in the eutectic have melting points of about 100° C. to about 150° C.

5. The ink of claim 4 wherein the amount of image forming agent will is from about 0.1 to about 10 percent, based upon the weight of the eutectic composition.

6. The ink of claim 5 wherein the amount of image forming agent is from about 1 to about 2 percent.

7. The ink of claim 6 wherein the image forming agent is a dye or a pigment.

8. A method for ink jet printing comprising:
   (a) providing a thermally reversible hot melt ink which is a solid at ambient temperature and a liquid at temperatures between about 80° C.–130° C., said ink comprising:
      (i) a eutectic composition; and
      (ii) an image-forming composition;
   (b) elevating the temperature of said eutectic composition to between about 90° C. and about 140° C., to cause said ink to form a liquid solution or suspension of said image-forming composition;
   (c) jetting said ink onto a substrate in the form of images;
   (d) allowing said ink to crystallize upon cooling on said substrate.

9. The method of claim 8 wherein the compounds comprising the eutectic composition have melting points from about 120° C. to about 150° C., the eutectic composition itself has a melting point from about 100° C. to about 120° C., and the amount of image forming agent is from about 1 to about 2 percent, based upon the weight of the eutectic.

10. The hot melt ink composition of claim 2 wherein the eutectic composition is comprised of two or more compounds selected from the group consisting of aromatic amides.

11. The hot melt ink composition of claim 2 wherein the eutectic composition is comprised of two or more compounds selected from the group consisting of acetamide, benzamide, propionamide, DL-benzoin, ethylanthraquinone and benzene sulfonamide.

12. The hot melt ink composition of claim 2 wherein the eutectic composition is comprised of an aromatic sulfonamide and a compound selected from the group consisting of aromatic amides.

13. The hot melt ink composition of claim 2 wherein the eutectic composition is comprised of an aromatic sulfonamide and a compound selected from the group consisting of acetamide, benzamide, propionamide, DL-benzoin, ethylanthraquinone and benzenesulfonamide.

14. The hot melt ink composition of claim 2 wherein the eutectic composition is a mixture of benzenesulfonamide and p-toluenesulfonamide.

15. The hot melt ink composition of claim 2 wherein the eutectic composition is a mixture of 2-ethylanthraquinone and DL-benzoin.

16. The hot melt ink composition of claim 2 wherein the eutectic composition is a mixture of DL-benzoin and benzenesulfonamide.

* * * * *

UNITED STATES PATENT AND TRADEMARK OFFICE
CERTIFICATE OF CORRECTION

Page 1 of 2

PATENT NO. : 5,298,062
DATED : March 29, 1994
INVENTOR(S) : NICHOLAS A. DAVIES AND BEATRICE M. NICHOLAS It is certified that error appears in the above-identified patent and that said Letters Patent is hereby corrected as shown below:

Column 2, line 11, delete "394,54" and substitute therefor -- 394,154 --;

Column 2, line 58, add "s" to the end of "disadvantage";

Column 3, line 12, delete the "s" from "plastics";

Column 6, in the table, line 2, delete "sufonamide" and substitute therefor -- sulfonamide --;

Column 6, in the table, line 4, delete "solfonamide" and substitute therefor -- sulfonamide --;

Column 6, in the table, line 10, delete "sufonamide" and substitute therefor -- sulfonamide --;

Column 11, line 33, after "Citroflex" add -- 1 --; and

Column 11, line 55, after "from about" add -- 1 --.

Column 13, line 26, in "claim 2", after "claim" add -- 1 --; and

UNITED STATES PATENT AND TRADEMARK OFFICE
CERTIFICATE OF CORRECTION

PATENT NO. : 5,298,062
DATED : March 29, 1994
INVENTOR(S) : Nicholas A. Davies, et. al.

It is certified that error appears in the above-indentified patent and that said Letters Patent is hereby corrected as shown below:

Column 13, line 36, delete "will".

Signed and Sealed this

Twenty-second Day of November, 1994

Attest:

BRUCE LEHMAN

*Attesting Officer*   *Commissioner of Patents and Trademarks*